UNITED STATES PATENT OFFICE.

WERNER KELBE, OF CARLSRUHE, BADEN, GERMANY, ASSIGNOR TO THE ACTIEN-GESELLSCHAFT FÜR CHEMISCHE INDUSTRIE, OF RHEINAU, NEAR MANNHEIM, GERMANY.

PRODUCTION OF COLORING SUBSTANCES BY THE REACTION OF AROMATIC HYDRAZIN SULPHONIC ACIDS ON RETENCHINON.

SPECIFICATION forming part of Letters Patent No. 386,709, dated July 24, 1888.

Application filed April 5, 1888. Serial No. 269,707. (No specimens.)

*To all whom it may concern:*

Be it known that I, WERNER KELBE, professor and doctor of philosophy, a subject of the Duke of Brunswick, residing at Carlsruhe, in the Grand Duchy of Baden, German Empire, have invented new and useful Improvements in the Manufacture of Coloring Substances by the Reaction of Aromatic Hydrazin Sulphonic Acids on Retenchinon, of which the following is a specification.

Hitherto unsuccessful attempts have been made to condense retenchinon with the aromatic hydrazins, as also shown by the recent researches of Bamberger and Hooker. (Annalen der Chemie und Pharmacie, pages 124, 229.) By my invention this has been effected, and it has been found by exhaustive experiments that the process is possible when, instead of the free hydrazins, the sulphonic acids of the latter are used to act on the retenchinon. The hydrazin sulphonic acids to be employed are themselves easily prepared, as is known, by the reduction of the diazosulphonic acid through sulphide or chloride of tin. The hydrazin sulphonic acids which come into use, among others, in the process are those which are obtained from the following compounds in the aforesaid manner, namely: sulphanilic acid, meta-amidobenzole sulphonic acid, orthotoluidine para-sulphonic acid, paratoluidine orthosulphonic acid, xyloidine sulphonic acid, (from the commercial metaxyloidine,) cumidin sulphonic acid, (from pseudo cumidin,) alpha-naphthylamine sulphonic acid, (German Patent No. 22,547,) beta-naphthylamine delta-sulphonic acid, benzidin disulphonic acid, and benzidin sulphon disulphonic acid.

The extraction of the coloring substances is effected in the following manner: The necessary quantities of retenchinon and hydrazin sulphonic acid—for example, 24.4 kilograms (one molecule) retenchinon and 37.6 kilograms (two molecules) phenyl hydrazin sulphonic acid—are introduced into the water needed for the solution of the resulting coloring substances. The liquor is heated gradually to the boiling-point, and the boiling is continued until both sulphonic acid and chinone are dissolved and give a completely clear red-colored liquor. Then neutralization is effected with soda and the coloring substances precipitated with common salt.

The tinge of the colors obtained hitherto by the reaction of the aromatic hydrazin sulphonic acid on retenchinon lies between orange-red and bluish-red. These colors are characterized by their great fastness. For instance, it is not possible to succeed in removing these colors from wool dyed with them by leaving them for twenty-four hours in a solution of soap of one per cent. Some are so well fixed on the wool that they cannot be removed either by a cold or by a boiling solution of soda. They color together wool and silk in the acid bath, and are withdrawn completely from the dyeing-bath both by wool and silk.

What I claim as new, and desire to secure by Letters Patent, is—

1. The process of manufacturing coloring substances by condensing aromatic hydrazin sulphonic acid with retenchinon.

2. The red coloring-matter produced by the condensation of an aromatic hydrazin sulphonic acid with retenchinon, and having the characteristics above described.

In testimony whereof I have signed my name to this specification in the presence of two subscribing witnesses.

WERNER KELBE.

Witnesses:
 KARL BEUTEL,
 EMIL SERAUER.